United States Patent
Arnold et al.

[11] Patent Number: 5,498,784
[45] Date of Patent: Mar. 12, 1996

[54] PHOSPHONIC ACID-PENDENT BENZOXAZOLE COPOLYMERS

[75] Inventors: Fred E. Arnold, Centerville; Jom P. Chen, Hilliard, both of Ohio

[73] Assignee: The United States of America as represented by the Secretary of the Air Force, Wright-Patterson Air Force Base, Ohio

[21] Appl. No.: 393,586

[22] Filed: Feb. 21, 1995

[51] Int. Cl.$^6$ .................................................. C08G 79/02
[52] U.S. Cl. ........................... 528/337; 525/435; 528/171; 528/172; 528/173; 528/183; 528/186; 528/328; 528/341; 528/342; 528/344; 528/347; 528/352; 528/367
[58] Field of Search ...................... 528/171, 172, 528/173, 183, 186, 328, 337, 341, 342, 344, 347, 367, 352; 525/435

[56] References Cited

U.S. PATENT DOCUMENTS 5,316,695  5/1994  Wilkes et al. ........................ 252/315.6

*Primary Examiner*—Shelley A. Dodson
*Attorney, Agent, or Firm*—Charles E. Bricker; Thomas L. Kundert

[57] ABSTRACT

Alcohol-soluble aromatic heterocyclic copolymers having repeating units of the formula:

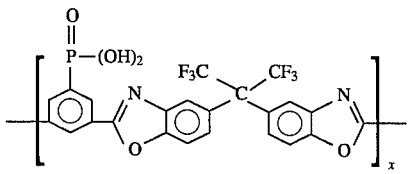

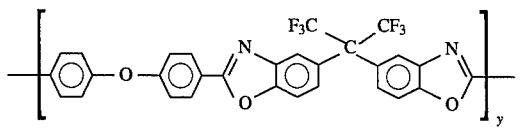

wherein x has a value of 0.05 to 0.50 and y has a value of 1.0–x.

These copolymers are useful in the preparation of organic/inorganic hybrid materials having transparency which comprise the sol-gel derived, hydrolytically condensed reaction product of a metal alkoxide of the formula $M(OR)_w$ wherein R is a lower alkyl group, M is Si, Ti, Al or a mixture thereof, and w is the valence value of M, and the above copolymer.

8 Claims, No Drawings

PHOSPHONIC ACID-PENDENT BENZOXAZOLE COPOLYMERS

RIGHTS OF THE GOVERNMENT

The invention described herein may be manufactured and used by or for the Government of the United States for all governmental purposes without the payment of any royalty.

BACKGROUND OF THE INVENTION

The present invention is directed to heterocyclic copolymers, particularly benzoxazole copolymer systems containing pendent phosphonic acid groups.

Sol-gel processing of ceramics and glass is an area of intense research interest because of inherent advantages compared to more conventional processing. By starting with well mixed solutions or sols, chemical homogeneity even on the molecular scale can be obtained.

A great variety of metal alkoxides are commercially available. Still others have been synthesized for specific uses. The alkoxides are utilized by first partially hydrolyzing the alkoxide,

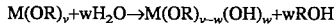

where R represents a lower alkyl group and M represents Si, Ti, Al and the like, as well as mixtures thereof. The partially hydrolyzed species are then allowed to link forming M—O—M bonds by a polymerization or condensation reaction.

The majority of work done on sol-gel of polymerized alkoxides has been done for glasses. Much of this centers around $SiO_2$ glasses or high $SiO_2$ glasses. The growing use of optical fibers for transmission of information at high rates has provided an incentive to seek fabrication methods for optical grade $SiO_2$ glass which is less expensive than vapor phase methods. Further, silicon alkoxides exist which are inexpensive, highly pure and easily polymerized to gels. The most common of these is tetraethylorthosilicate (TEOS), $Si(C_2H_5O)_4$, the ethoxide of silicon. When an alcohol (e.g., ethanol) is used as a mutual solvent, TEOS can be mixed with water. This mixture is slow to hydrolyze, but the rate can be increased by additions of acids or bases as catalysts. Acid catalyzed gels form transparent gels which appear to be rather uniform polymers. Base catalyzed gels are not as transparent and are thought to contain $SiO_2$ clusters which then link together to form a gel.

In the case of TEOS, the mechanism for gel formation is polymerization after partial hydrolysis of $Si(C_2H_5O)_4$ to have both ethyl groups and hydroxide groups attached to the Si:

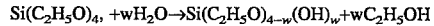

Reaction of an OH group on one Si with a $C_2H_5O$ group on another releases another alcohol molecule and forms a siloxane bond, Si—O—Si, at all temperatures close to ambient. These siloxane bonds form the basis for the polymerization and thus the gelation.

Such gels contain large amounts of water and alcohol, leaving a low density of $SiO_2$. Drying such gels results in large shrinkages as liquid-filled pores partially collapse. Since the liquid content of the gel is large and the pores are small, liquid transport is slow and rapid drying leads to large shrinkages near the gel body surfaces. Because the mechanical strength of the gel is low, these non-uniform shrinkages lead to cracking.

Several studies have demonstrated the successful incorporation of various functionalized oligomers into a sol-gel network to produce novel organic/hybrid materials referred to as 'ceramers'. Such studies have involved, for example, a sol-gel reaction using tetramethylorthosilicate (TMOS) or TEOS and silanol-terminated poly(dimethylsiloxane). Other systems investigated were hybrids based upon TEOS or TMOS, or related metal alkoxides, reacted with an oligomer of poly(tetramethylene oxide) endcapped with isocyanatopropyltriethoxysilane. Wilkes et al, U.S. Pat. No. 5,316,695, disclose the use of a polymeric catalyst, such as poly(styrenesulfonic acid), in such a system.

Organic/inorganic hybrid materials prepared through sol-gel processing have the potential to possess the desired properties of both organic and inorganic components, such as high tensile modulus, scratch resistance, thermal and dimensional stability from the inorganic network, as well as toughness, flexibility and light weight from the organic portion. A variety of high performance, thermally stable polymeric structures are known, but they are intractable and virtually impossible to process. Aromatic heterocyclic polymers are the most attractive high temperature, high performance polymer systems. Although these polymers have excellent high temperature properties, they exhibit solubility only in high boiling aprotic or acidic solvents.

Accordingly, it is an object of the present invention to provide aromatic heterocyclic polymers having improved solubility properties.

It is another object of the present invention to provide aromatic heterocyclic polymers having functionality for co-reaction with metal alkoxides for preparing ceramers.

Other objects and advantages of the present invention will be apparent to those skilled in the art.

SUMMARY OF THE INVENTION

In accordance with the present invention there are provided aromatic heterocyclic copolymers of the formula:

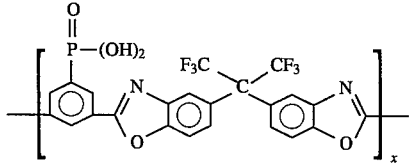

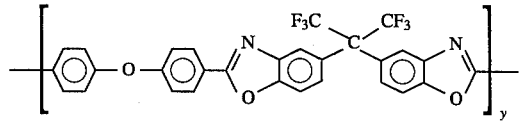

wherein x has a value of 0.05 to 0.50 and y has a value of 1.0−x.

This copolymer is derived from the polycondensation of 5-phosphonoisophthalic acid, 4,4'-oxybisbenzoic acid and 4,4'-[2,2,2-trifluoro-1-(trifluoromethyl)ethylidene]bis[2-aminophenol] dihydrochloride, as shown below. Briefly, the polymerization process comprises the following steps: (i) dehydrochlorination of the diamino-diol dihydrochloride in the presence of the dicarboxylic acid monomers in 77% polyphosphoric acid (PPA); (ii) addition of $P_2O_5$ to raise the $P_2O_5$ content of the medium to 82–84%; (iii) chain propagation and cyclodehydration; and (iv) precipitation of the polymer into water, followed by washing and drying the polymer. Step iii may be carried out at a temperature of about 160° to 190° C. for about 4 to 64 hours. It is generally preferred to carry out the polymerization in step-wise fashion, for example, heat to 165° C. over a period of 2–4 hours, 165° C. for 16 hours, then 172° C. for 48 hours. The overall polymerization reaction is:

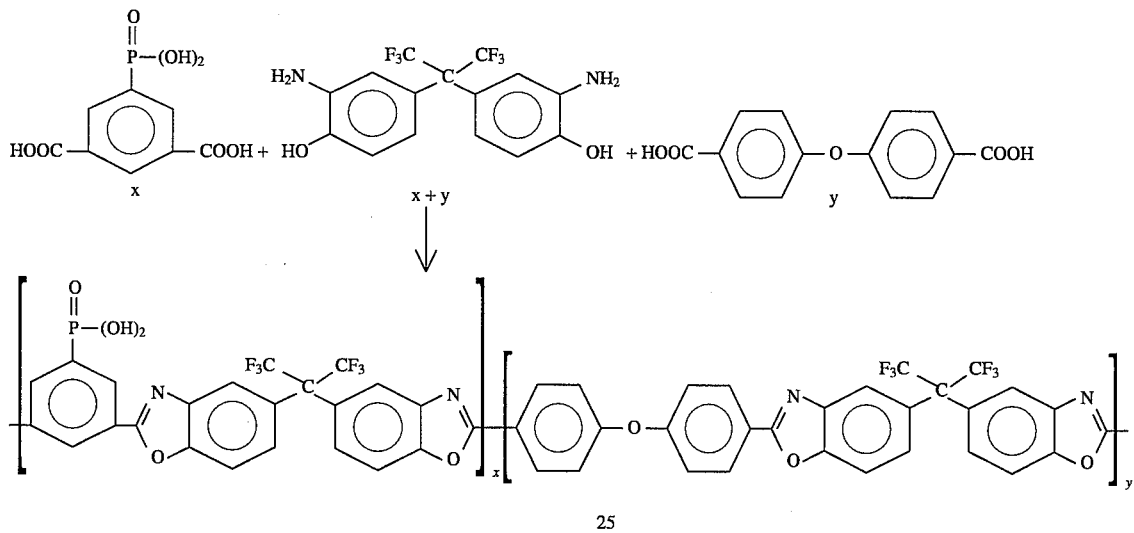

The 5-phosphonoisophthalic acid is prepared as shown by the following reactions: The first step consists of reacting 5-bromoxylene with triethyl phosphite in the presence of nickel bromide, at an elevated temperature, as shown:

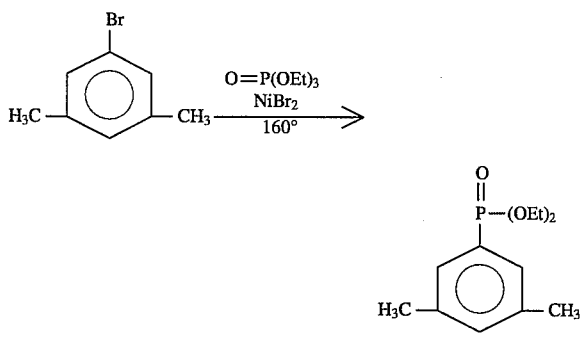

The resulting 1,3-(5-diethylphosphonyl)xylene is then reacted with hydrobromic acid, to provide 5-phosphono-1,3-xylene:

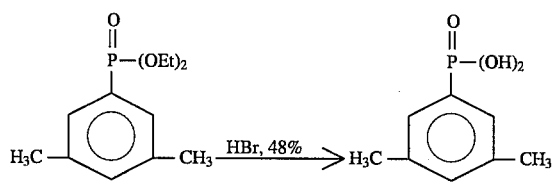

The 5-phosphono-1,3-xylene is oxidized with potassium permanganate to provide the 5-phosphonoisophthalic acid:

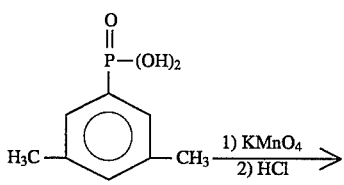

-continued

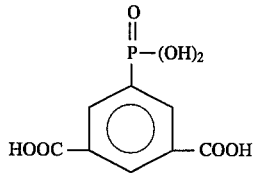

The organic/inorganic hybrid materials can be prepared by a number of different methods including, for example, the combination of the phosphonic acid-pendent benzoxazole copolymers of this invention with TMOS, as illustrated hereinafter. The ratio, by weight, of organic polymer to the metal alkoxide can range from 1:9 to 9:1.

Generally, there is initially prepared a solution of the phosphonic acid-pendent benzoxazole copolymer in a suitable solvent at a concentration of about 1 to 10 percent (weight/volume), preferably about 6–8 percent. Suitable solvents are generally aprotic solvents, such as THF, DMAC and the like. To this solution is added a measured amount of water and TMOS at a mole ratio (water:TMOS) of 3.0:1 to 3.5:1. The resulting mixture is stirred until an homogeneous solution is obtained. Coupling or crosslinking between the organic and inorganic polymers is promoted by the addition of a coupling agent to this mixture. Suitable coupling agents contain groups which can react with both the organic polymer and the inorganic polymer, for example, isocyanopropyltriethoxysilane, isocyanopropyltrimethoxysilane, gamma-aminopropyltrimethoxysilane or gamma-aminopropyltriethoxysilane. The coupling agent is used in an amount of about 1 to 15 mol %, preferably about 5 to 10 mol %, based on the inorganic polymer-forming compound.

Thereafter, the resulting semigel, in one embodiment of the invention, can be formed into a thin film by known methods, such as vacuum evaporation, or applied to a supporting substrate. If phase separation occurs, as indicated by opacity, the material can be made transparent by thermal treatment at about 60°–100° C. for about 10 minutes to 2 hours. Alternatively, it can be cast into a suitable mold, dried slowly over a period of 8 to 200 hours at room temperature, then dried under vacuum for 8 to 48 hours at 80°–100° C.

The following examples illustrate the invention:

EXAMPLE I

Preparation of 5-Phosphonoisophthalic Acid 1,3-(5-diethylphosphonyl)xylene: In a two-neck flask equipped with addition funnel and distilling head with condenser on the side arm were placed 69.0 g of 5-bromoxylene and 3.93 g of $NiBr_2$. The mixture was heated to 160° C. under a nitrogen atmosphere. 71.8 g of triethyl phosphite was added dropwise over a period of 2½ hours. Ethyl bromide distilled rapidly from the reaction mixture. After complete addition, the mixture was heated for an additional 1½ hours, then poured into water after cooling. Extraction of the aqueous mixture with $CH_2Cl_2$ followed by water washing and drying over anhydrous magnesium sulfate gave, after solvent removal, 85.8 g of crude, oil-like product, which was used without further purification in the next step:

5-Phosphono-1,3-xylene: In a flask equipped with a distilling column with a condenser on the side arm were placed 71 g of the crude 1,3-(5-diethylphosphonyl)xylene and 200 ml of 48% HBr. The mixture was heated at 110° C. for 16 hours. After cooling, the solid was collected and washed with cold water. The product was boiled in 120 ml of ethyl acetate for 0.5 hours. Filtration gave 45.5 g of product, mp 197°–9° C.

5-Phosphonoisophthalic acid: In a flask equipped with condenser and mechanical stirrer were placed 6.6 g of 5-phosphono-1,3-xylene and 300 ml water. 5.0 g of $KMnO_4$ and 10 ml water were added at 50° C. The mixture was stirred about 15 minutes, then over a period of 7 hours 40 g of $KMnO_4$ and 190 ml water were added in six portions while raising the temperature to 90° C. The mixture was heated at 90° C. overnight. After cooling to room temperature, the solid residue was removed and washed with dilute aqueous KOH by filtration. The filtrate was acidified with conc. HCl. 4.14 g of 5-phosphonoisophthalic acid was collected as white needle crystals from the acid solution. Mp 360° C., m/e 246 (M)$^+$, Analysis calculated for $C_8H_7O_7P$: C, 39.02; H, 2.85; P, 12.60. Found: C, 38.6; H, 2.77; P, 12.55.

EXAMPLE II

Copolymer Preparation (10:90)

Into a resin flask equipped with a mechanical stirrer, nitrogen inlet and outlet, were placed 4,4'-dicarboxybiphenylether (4.644 g, 18 mmol), 5-phosphonoisophthalic acid (0.528 g, 2.0 mmol), 4,4'-(2,2,2-trifluoro-1-(trifluoromethyl)ethylidene)bis(2-aminophenol) (7.32 g, 20 mmol) (available from Daychem Labs, Inc. Dayton Ohio) and polyphosphoric acid (PPA, 115%, 104 g). The reaction mixture was heated at 130° C. for 2½ hours under nitrogen at reduced pressure to remove air. The mixture was cooled to 120° C. and 9.8 g of 99.9% phosphorus pentoxide ($P_2O_5$) was added. The mixture was then heated from 120° C. to 165° C. over a period of 1½ hours, held at 165° C. for 65 hours, then heated to 180°–185° C. for 2 hours. After cooling to 100° C., 70 g of 85% phosphoric acid was added and the mixture was stirred for 2 hours to give an homogeneous solution. The reaction mixture was poured into water to precipitate the copolymer. The precipitated copolymer was chopped in a high speed blender, then thoroughly washed with hot water, filtered and dried. A copolymer with $(\eta)=1.11$ dL/g (methanesulfonic acid, 30° C.) was obtained in quantitative yield.

EXAMPLE III

Copolymer Preparation (17:83)

Into a resin flask equipped with a mechanical stirrer, nitrogen inlet and outlet, were placed 4,4'-dicarboxybiphenylether (1.032 g, 4 mmol), 5-phosphonoisophthalic acid (0.1968 g, 0.8 mmol), 4,4'-(2,2,2-trifluoro-1-(trifluoromethyl)ethylidene)bis(2-aminophenol) (1.7568 g, 4.8 mmol) and polyphosphoric acid (PPA, 115%, 26 g). The reaction mixture was heated at 120° C. for 2½ hours under nitrogen at reduced pressure to remove air. The mixture was cooled to 120° C. and 3 g of 99.9% phosphorus pentoxide ($P_2O_5$) was added. The mixture was then heated at 165° C. for 20 hours and 170° C. for 44 hours. After cooling to 100° C., 60 g of 85% phosphoric acid was added and the mixture was stirred for 2 hours to give an homogeneous solution. The reaction mixture was poured into water to precipitate the copolymer. The precipitated copolymer was chopped in a high speed blender, then thoroughly washed with hot water, filtered and dried. A copolymer with $(\eta)=1.16$ dL/g (methanesulfonic acid, 30° C.) was obtained in quantitative yield.

EXAMPLE IV

Preparation of Organic/Inorganic Hybrid Material 0.2 g of the copolymer of Example II was dissolved in 3.0 ml of anhydrous THF. 0.045 ml of water and 0.125 g of tetramethoxysilane were then added to the copolymer/THF solution. The resulting mixture was stirred for 30 minutes at room temperature. The resulting viscous homogeneous solution was transferred to a Petri dish and dried slowly over a period of 24 hours. The resulting film was opaque, indicating the occurrence of phase separation. Thermal treatment at 60°–100° C. made the film transparent.

Various modifications may be made in the instant invention without departing from the spirit and scope of the appended claims.

We claim:

1. An aromatic heterocyclic copolymer having repeating units of the formula:

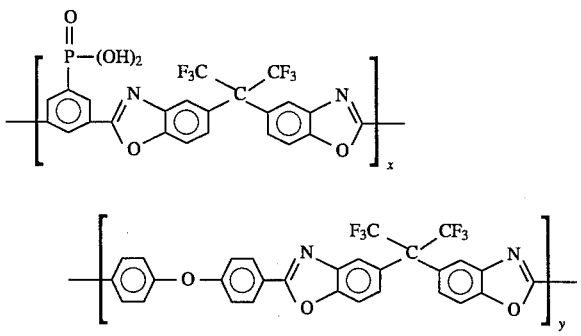

wherein x has a value of 0.05 to 0.50 and y has a value of 1.0–x.

2. The copolymer of claim 1 wherein x is 0.10 and y is 0.90.

3. The copolymer of claim 1 wherein x is 0.17 and y is 0.83.

4. An organic/inorganic hybrid material having transparency which comprises the sol-gel derived, hydrolyrically condensed reaction product of a metal alkoxide of the formula $M(OR)_w$ wherein R is methyl or ethyl, M is Si, Ti, Al or a mixture thereof, and w is the valence value of M, and a copolymer having repeating units of the formula:

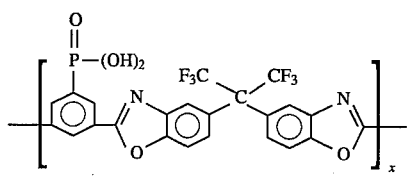

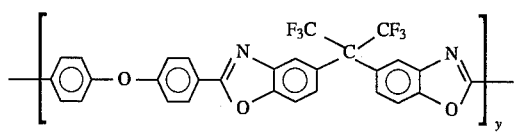

wherein x has a value of 0.05 to 0.50 and y has a value of 1.0−x.

5. The hybrid material of claim 4 wherein the weight ratio of said copolymer to said metal alkoxide is in the range of 1:9 to 9:1.

6. The hybrid material of claim 4 further comprising about 1 to 15 mol % of a silane coupling agent.

7. The hybrid material of claim 6 wherein said coupling agent is selected from the group consisting of isocyanopropyltriethoxysilane, isocyanopropyltrimethoxysilane, gamma-aminopropyltrimethoxysilane and gamma-aminopropyltriethoxysilane.

8. The hybrid material of claim 4 wherein said metal alkoxide is tetramethoxysilane.

\* \* \* \* \*